US012600333B2

(12) United States Patent
Heil et al.

(10) Patent No.: US 12,600,333 B2
(45) Date of Patent: Apr. 14, 2026

(54) DIFFERENTIAL BRAKING AND YAW RATE MITIGATION DURING BRAKE-BY-WIRE BRAKING EVENTS WITH INCREASED DECELERATION DURING FAILURE EVENTS

(71) Applicant: GM GLOBAL TECHNOLOGY OPERATIONS LLC, Detroit, MI (US)

(72) Inventors: Edward Thomas Heil, Howell, MI (US); Matthew Allen Robere, Novi, MI (US); Eric E. Krueger, Chelsea, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 746 days.

(21) Appl. No.: 17/968,360

(22) Filed: Oct. 18, 2022

(65) Prior Publication Data

US 2024/0123957 A1 Apr. 18, 2024

(51) Int. Cl.
| | |
|---|---|
| *B60T 8/88* | (2006.01) |
| *B60T 7/12* | (2006.01) |
| *B60T 8/26* | (2006.01) |
| *B60T 8/92* | (2006.01) |
| *B60T 13/66* | (2006.01) |

(52) U.S. Cl.
CPC ............... *B60T 8/885* (2013.01); *B60T 7/12* (2013.01); *B60T 8/26* (2013.01); *B60T 8/92* (2013.01); *B60T 13/662* (2013.01); *B60T 2250/03* (2013.01); *B60T 2270/82* (2013.01); *B60T 2270/86* (2013.01)

(58) Field of Classification Search
CPC ... B60T 8/885; B60T 7/12; B60T 8/26; B60T 8/92; B60T 13/662; B60T 2250/03; B60T 2270/82; B60T 2270/86; B60T 17/22; B60T 8/1755; B60T 8/17551; B60T 2270/413
See application file for complete search history.

(56) References Cited

U.S. PATENT DOCUMENTS

| | | | | |
|---|---|---|---|---|
| 2001/0054843 | A1* | 12/2001 | Schmidt | ................ B60T 17/226 303/122.13 |
| 2011/0108375 | A1* | 5/2011 | Wuerth | .................... B60T 8/344 188/106 P |
| 2017/0361834 | A1* | 12/2017 | Paskus | ................... B60T 8/1708 |
| 2018/0257656 | A1* | 9/2018 | Zhao | ......................... B60K 6/52 |
| 2018/0273006 | A1* | 9/2018 | Murayama | .......... B60T 8/17551 |
| 2019/0315325 | A1* | 10/2019 | Yun | ......................... B60T 17/221 |
| 2024/0227808 | A1* | 7/2024 | Lo | ........................ B60W 50/035 |

* cited by examiner

*Primary Examiner* — Pamela Rodriguez

(57) ABSTRACT

A braking system includes: brake circuits independently activated and deactivated and when activated apply braking force at respective wheels; a braking stability module detecting an issue or a failure with a first one of the brake circuits where an unexpected amount of braking torque is being applied as compared to an amount of braking torque applied at a second one of the brake circuits, and mitigating effect of the unexpected amount of braking torque on a yaw rate of the vehicle by i) adjusting the braking torque of the first one of the brake circuits, ii) adjusting braking torque of the second one of the brake circuits, and/or iii) deactivating the first one of the brake circuits and modulating braking torque of the second one of the brake circuits, to compensate for the unexpected amount of braking torque.

20 Claims, 5 Drawing Sheets

DIFFERENTIAL BRAKING AND YAW RATE MITIGATION DURING BRAKE-BY-WIRE BRAKING EVENTS WITH INCREASED DECELERATION DURING FAILURE EVENTS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to brake-by-wire systems.

Vehicles can include brake-by-wire systems for electronic deceleration purposes. The deceleration purposes may be associated with a brake torque request generated by a vehicle control module and/or as a result of a user actuating a brake actuator. For example, vehicles can include deceleration control systems, object detection systems, collision avoidance systems, adaptive cruise control systems, forward collision warning systems, and autonomous vehicle control systems for detecting objects and taking actions to avoid a collision. An adaptive cruise control system may adjust speed of a host vehicle to prevent collision with another vehicle in front of the host vehicle. A collision avoidance system may detect an oncoming vehicle and take an evasive action and/or perform a countermeasure to avoid colliding with the approaching vehicle. The actions performed may include applying a brake to decelerate the host vehicle.

SUMMARY

A braking system is disclosed and includes: brake circuits configured to be independently activated and deactivated and when activated apply braking force at respective wheels of a vehicle; a braking stability module configured to detect an issue or a failure with a first one of the brake circuits where an unexpected amount of braking torque is being applied as compared to an amount of braking torque applied at a second one of the brake circuits, and mitigate effect of the unexpected amount of braking torque on a yaw rate of the vehicle by at least one of i) adjusting the braking torque of the first one of the brake circuits to compensate for the unexpected amount of braking torque, ii) adjusting braking torque of the second one of the brake circuits to compensate for the unexpected amount of braking torque, and iii) deactivating the first one of the brake circuits and modulating braking torque of the second one of the brake circuits to compensate for the unexpected amount of braking torque, the first one of the brake circuits being on a different side of the vehicle than the second one of the brake circuits.

In other features, the braking stability module is configured to mitigate the effect of the unexpected amount of braking torque on the yaw rate of the vehicle by adjusting the braking torque of the first one of the brake circuits to compensate for the unexpected amount of braking torque.

In other features, the braking stability module is configured to mitigate the effect of the unexpected amount of braking torque on the yaw rate of the vehicle by adjusting braking torque of a second one of the brake circuits to compensate for the unexpected amount of braking torque.

In other features, the braking stability module is configured to mitigate the effect of the unexpected amount of braking torque on the yaw rate of the vehicle by deactivating the first one of the brake circuits and modulate braking torque of the second one of the brake circuits.

In other features, the braking stability module is configured to mitigate the effect of the unexpected amount of braking torque on the yaw rate of the vehicle by modulating braking force of at least one of the first one of the brake circuits and the second one of the brake circuits based on permanent vehicle handling characteristics.

In other features, the braking stability module is configured to mitigate the effect of the unexpected amount of braking torque on the yaw rate of the vehicle by modulating braking force of at least one of the first one of the brake circuits and the second one of the brake circuits based on dynamic vehicle state parameters.

In other features, the braking stability module is configured to mitigate the effect of the unexpected amount of braking torque on the yaw rate of the vehicle by modulating braking force of at least one of the first one of the brake circuits and the second one of the brake circuits based on a location of the first one of the brake circuits.

In other features, the braking stability module is configured to detect a failure with the first one of the brake circuits, and in response to detecting the failure, deactivating the first one of the brake circuits and modulating braking torque of the second one of the brake circuits.

In other features, the braking stability module is configured to determine a side-to-side brake torque differential of the vehicle and reduce the side-to-side brake torque differential by at least one of i) increasing the braking torque of the first one of the brake circuits, ii) adjusting braking torque of the second one of the brake circuits, and iii) deactivating the first one of the brake circuits and modulating braking torque of the second one of the brake circuits.

In other features, the braking stability module is configured to detect a failure of the first one of the brake circuits and maintain active operation of all of the other ones of the brake circuits to maximize deceleration of the vehicle while minimizing the yaw rate of the vehicle.

In other features, a braking stability method is disclosed and includes: detecting an issue or a failure with a first one of multiple brake circuits where an unexpected amount of braking torque is being applied as compared to an amount of braking torque applied at a second one of the brake circuits, the brake circuits being configured to be independently activated and deactivated and when activated apply braking force at respective wheels of a vehicle; and mitigating effect of the unexpected amount of braking torque on a yaw rate of the vehicle by at least one of i) adjusting the braking torque of the first one of the brake circuits to compensate for the unexpected amount of braking torque, ii) adjusting braking torque of the second one of the brake circuits to compensate for the unexpected amount of braking torque, and iii) deactivating the first one of the brake circuits and modulating braking torque of the second one of the brake circuits, the first one of the brake circuits being on a different side of the vehicle than the second one of the brake circuits.

In other features, the braking stability method further includes mitigating the effect of the unexpected amount of braking torque on the yaw rate of the vehicle by adjusting the braking torque of the first one of the brake circuits to compensate for the unexpected amount of braking torque.

In other features, the braking stability method further includes mitigating the effect of the unexpected amount of braking torque on the yaw rate of the vehicle by adjusting braking torque of a second one of the brake circuits to compensate for the unexpected amount of braking torque.

In other features, the braking stability method further includes mitigating the effect of the unexpected amount of braking torque on the yaw rate of the vehicle by deactivating the first one of the brake circuits and modulate braking torque of the second one of the brake circuits.

In other features, the braking stability method further includes mitigating the effect of the unexpected amount of braking torque on the yaw rate of the vehicle by modulating braking force of at least one of the first one of the brake circuits and the second one of the brake circuits based on permanent vehicle handling characteristics.

In other features, the braking stability method further includes mitigating the effect of the unexpected amount of braking torque on the yaw rate of the vehicle by modulating braking force of at least one of the first one of the brake circuits and the second one of the brake circuits based on dynamic vehicle state parameters.

In other features, the braking stability method further includes mitigating the effect of the unexpected amount of braking torque on the yaw rate of the vehicle by modulating braking force of at least one of the first one of the brake circuits and the second one of the brake circuits based on a location of the first one of the brake circuits.

In other features, the braking stability method further including detecting a failure with the first one of the brake circuits, and in response to detecting the failure, deactivating the first one of the brake circuits and modulating braking torque of the second one of the brake circuits.

In other features, the braking stability method further includes determining a side-to-side brake torque differential of the vehicle and reduce the side-to-side brake torque differential by at least one of i) increasing the braking torque of the first one of the brake circuits, ii) adjusting braking torque of the second one of the brake circuits, and iii) deactivating the first one of the brake circuits and modulating braking torque of the second one of the brake circuits.

In other features, the braking stability method further includes detecting a failure of the first one of the brake circuits and maintain active operation of all of the other ones of the brake circuits to maximize deceleration of the vehicle while minimizing the yaw rate of the vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
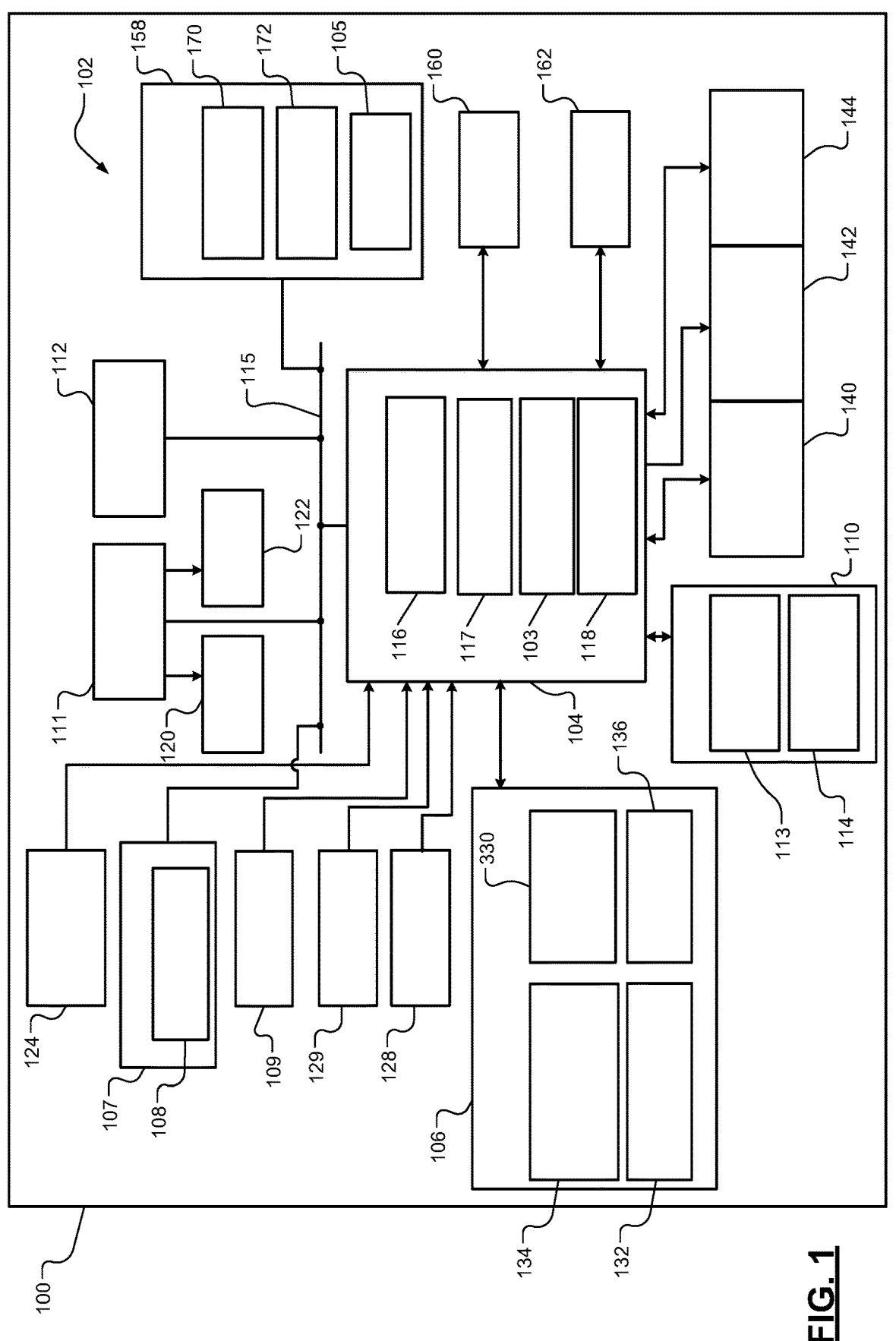
FIG. 1 is a functional block diagram of a vehicle including a brake control system including a braking stability module in accordance with the present disclosure.

A traditional hydraulic braking system may include two hydraulic circuits, which are configured to apply brake pressure at corresponding brake calipers. As an example, each hydraulic circuit may be used to apply brake pressure at one front wheel caliper and one rear wheel caliper of a four-wheel vehicle. For each hydraulic circuit, the front wheel caliper is diagonally located from and thus on an opposite side of the vehicle from the rear wheel caliper. In the event of a braking system failure (e.g., hydraulic fluid leak) with one of the hydraulic circuits, the other hydraulic circuit can be used to decelerate the vehicle. As another example, a first hydraulic circuit may include the two front brake calipers and the second hydraulic circuit may include the two rear brake calipers. In these traditional hydraulic braking systems, the brake calipers are hydraulically connected to a brake actuator (e.g., a brake pedal).

Some traditional hydraulic braking systems having two hydraulic circuits are configured to allow a first one of the hydraulic circuits experiencing a failure to be disconnected or isolated. This is due to the fact that hydraulic braking system failures are not generally found at the wheel of a vehicle but rather upstream where the failure affects a brake circuit. Although the hydraulic circuit of a braking system that is experiencing a failure is able to be disconnected, the braking system has a reduced amount of total available braking force due to only being able to apply brake force using two brake calipers instead of four brake calipers.

In brake-by-wire systems implementing electromechanical braking (EMB) and including single corner actuators (SCAs), the potential for a failure at the wheel (i.e., at an EMB caliper) increases because an EMB caliper consists of an electronic controller, an electric motor, and wiring connections rather than a simple mechanical caliper. EMB and SCA systems do not have a mechanical backup braking mode and thus when a EMB caliper is not functional, the non-functioning EMB caliper cannot be used for braking.

The examples set forth herein include braking stability control systems for mitigating differential brake torque between sides of a vehicle and yaw rate experienced by a vehicle during braking events when operating in a fully active mode. The braking stability control systems further mitigate differential brake torque and yaw rate experienced by a vehicle and provide increased braking during braking events when operating in a partially active mode. The increased braking is relative to a traditional dual circuit braking system when a braking system failure in one of the circuits exists. The fully active mode refers to when all brake circuits (e.g., all four brake controllers and corresponding calipers) of a vehicle are active. The partially active mode refers to when a braking system failure exists with one or more brake circuits and the one or more brake circuits are deactivated and prevented from providing brake torque. As an example, one brake controller and/or caliper may be deactivated while the three other brake controllers and/or calipers may be active. Differential brake torque refers to when more brake torque is provided on a first side (e.g., driver or passenger side) of the vehicle than on the other side of the vehicle causing the vehicle to pull toward the side of the vehicle experiencing the higher level of braking torque.

Figure 2:
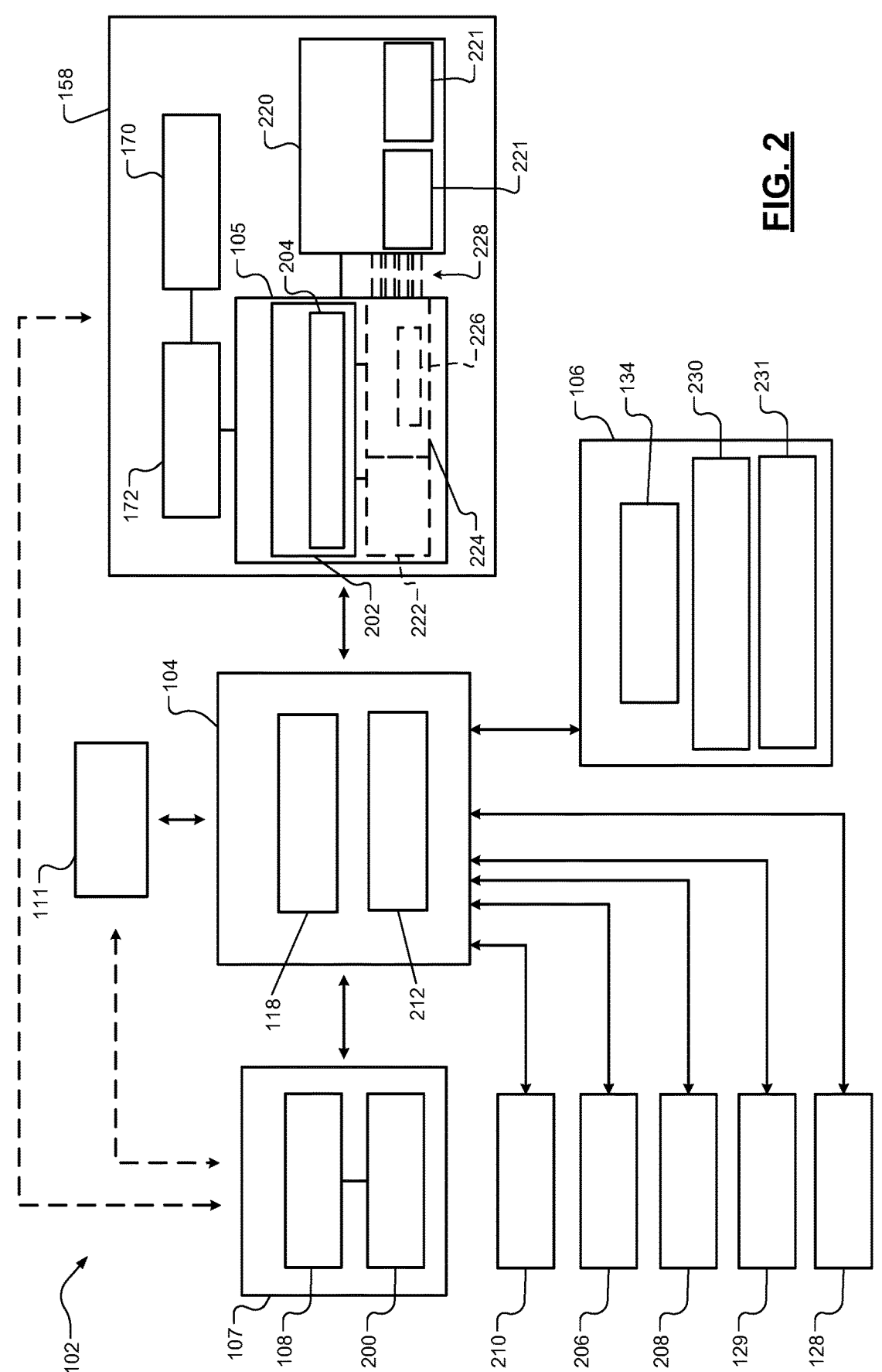
FIG. 2 is a function block diagram of the brake control system including an electronic braking control module (EBCM) including a braking stability module in accordance with the present disclosure.

FIG. 1 shows a vehicle 100 including a brake control system 102 including a braking stability module 103. Although the braking stability module 103 is shown as being implemented at a vehicle control module 104, the braking stability module 103 may be implemented at an electronic braking control module (EBCM) 105, as shown in FIG. 2. The braking stability module 103 and/or the EBCM 105 provides brake stability during braking events including adjusting brake torque provided via brake controllers and calipers (shown in FIG. 2) to minimize changes in and/or magnitudes of differential brake levels and/or yaw rates during braking events. This stability is provided while operating in fully active and partially active modes.

The braking stability module 103 and/or the EBCM 105 may select brake pressure versus brake actuator profiles and/or brake force versus brake actuator profiles to follow during braking events for each brake controller. This selection may be based on permanent vehicle handling characteristics, dynamic vehicle state parameters, location of active brake controllers/calipers on the vehicle 100, etc. The permanent vehicle handling characteristics may refer to suspension geometry of the vehicle, size of brake calipers and pads, number of pistons per caliper, and/or other parameters that are unchanged during operation. The dynamic vehicle state parameters may include yaw rate of the vehicle 100, speed of the vehicle 100, deceleration rate of the vehicle 100, steering angle of a steering wheel and/or front wheels of the vehicle 100, load states of axles of the vehicle 100, etc. A load state refers to amount of weight on each axle of the vehicle 100. The locations of the active brake controllers may refer to left-front, right-front, left-rear, and right-rear for the four brake controllers and corresponding brake calipers at respective wheels of the vehicle 100. The stated profiles may be i) selected as baselines and provide pressure and/or force values based on the stated characteristics, parameters, locations, and brake torque requests, and/or ii) altered based on the stated parameters, locations, torque differentials thresholds, and/or yaw rate thresholds.

The vehicle 100 may be a non-autonomous, partially autonomous or fully autonomous vehicle. The vehicle 100 may be non-electric, hybrid or fully electric vehicle. The vehicle 100 includes vehicle control module 104, a memory 106, a vision sensing (or perception) system 107 including object detection sensors 108, and other sensors 109. The vehicle 100 may further include a power source 110, an infotainment module 111 and other control modules 112. The power source 110 includes one or more battery packs (one battery pack 113 is shown) and a control circuit 114. The object detection sensors 108 may include cameras, radar sensors, lidar sensors, etc. The other sensors 109 may include temperature sensors, accelerometers, wheel speed sensors, a vehicle velocity sensor, and/or other sensors. The modules 104, 105, 111, 112 may communicate with each other and have access to the memory 106 via one or more buses and/or network interfaces 115. The network interfaces 115 may include a controller area network (CAN) bus, a local interconnect network (LIN) bus, an auto network communication protocol bus, and/or other network bus.

The vehicle control module 104 controls operation of vehicle systems. The vehicle control module 104 may include the braking stability module 103, a mode selection module 116, a parameter adjustment module 117, an object detection module 118, as well as other modules. The mode selection module 116 may select a vehicle operating mode.

The parameter adjustment module 117 may be used to adjust, obtain and/or determine parameters of the vehicle 100 based on, for example, signals from the sensors 108, 109 and/or other devices and modules referred to herein.

The vehicle 100 may further include a display 120, an audio system 122, and one or more transceivers 124. The display 120 and/or audio system 122 may be implemented along with the infotainment module 111 as part of an infotainment system. The display 120 and/or audio system 122 may be used to indicate brake alert messages to apply brakes due to an approaching and/or nearing object.

The vehicle 100 may further include a global positioning system (GPS) receiver 128 and a MAP module 129. The GPS receiver 128 may provide vehicle velocity and/or direction (or heading) of the vehicle and/or global clock timing information. The GPS receiver 128 may also provide vehicle location information. The MAP module 129 provides map information. The map information may include traffic control objects, routes being traveled, and/or routes to be traveled between starting locations (or origins) and destinations. The vision sensing system 107, the GPS receiver 128 and/or the MAP module 129 may be used to determine location of objects and position of the host vehicle 100 relative to the objects. This information may also be used to determine i) heading information of the host vehicle 100 and/or the objects, and ii) a relative speed of the host vehicle 100 relative to the objects.

The memory 106 may store sensor data 130, vehicle parameters 132, a braking stability application 134 and other applications 136. The braking stability application 134 may be implemented by the braking stability module 103 and/or the EBCM 105. The applications 136 may include applications executed by the modules 104, 111, 112. Although the memory 106 and the vehicle control module 104 are shown as separate devices, the memory 106 and the vehicle control module 104 may be implemented as a single device. The memory 106 may be accessible to the EBCM 105. The EBCM 105 may also include memory storing the braking stability application 134 and/or brake information, such as brake pressure or force versus brake actuator distance profiles. The brake pressure or force versus brake actuator distance profiles may be stored in the memory 106. See also FIG. 2.

The vehicle control module 104 may control operation of an engine 340, a converter/generator 142, a transmission 144, a brake actuator system 158, electric motors 160 and/or a steering system 162 according to parameters set by the modules 103, 104, 105, 111, 112, 118. The vehicle control module 104 may set some of the vehicle parameters 132 based on signals received from the sensors 108, 109. The vehicle control module 104 may receive power from the power source 110, which may be provided to the engine 140, the converter/generator 142, the transmission 144, the brake actuator system 158, the electric motors 160 and/or the steering system 162, etc. Some of the vehicle control operations may include enabling fuel and spark of the engine 140, starting and running the electric motors 160, powering any of the systems 102, 158, 162, and/or performing other operations as are further described herein.

The engine 140, the converter/generator 142, the transmission 144, the brake actuator system 158, the electric motors 160 and/or the steering system 162 may include actuators controlled by the vehicle control module 104 to, for example, adjust fuel, spark, air flow, steering wheel angle, throttle position, pedal position, etc. This control may be based on the outputs of the sensors 108, 109, the GPS receiver 128, the MAP module 129 and the above-stated data and information stored in the memory 106.

The brake actuator system 158 may be implemented as a brake-by-wire system, such as an electromechanical braking system or an electro-hydraulic braking system. In an embodiment, the brake actuator system 158 may include the EBCM 105, a brake actuator 370 and a brake actuator sensor 172. The brake actuator 170 may include a traditional style brake pedal and/or other brake actuator, such as a handheld brake actuator. The brake actuator sensor 172 detects position of the brake actuator 170, which is used to determine displacement of the brake actuator 170. The EBCM 105 may include a motor (or pump) and an electronic control module for controlling operation of the motor. The motor may adjust brake pressure. The brake pressure may refer to pressure of a hydraulic fluid used to actuate brake pads. In an electro-mechanical configuration, the motor is not included.

The vehicle control module 104 may determine various parameters including a vehicle speed, an engine speed, an engine torque, yaw rate, a gear state, an accelerometer position, a brake pedal position, an amount of regenerative (charge) power, and/or other information.

FIG. 2 shows the brake control system 102 including the EBCM 105, which includes an electronic control module 202 implementing a braking stability module 204. The braking stability module 204 may operate similarly as the braking stability module 103 of FIG. 1. The brake control system 102 further includes the vehicle control module 104, the memory 106, the vision sensing system 107, the infotainment module 111, and the brake actuator system 158. The vision sensing system 107 may include the object detection sensor 108 and an object detection module 200. The object detection module 200 may be implemented at the vehicle control module 104. If implemented at the vision sensing system 107, the object detection module 200 may communicate with the infotainment module 111 and/or, for example, an electronic control module 202 of the EBCM 105. The object detection module 200 may operate similarly as the object detection module 118.

The object detection modules 200, 118 may detect objects, determine locations of the objects relative to the host vehicle, and headings and speeds of the objects and/or the host vehicle. The speed of the host vehicle may be determined via a vehicle speed sensor 406. The locations, headings and/or speeds of the host vehicle and the objects may be determined via the GPS receiver 128 and the MAP module 129. The object detection modules 200, 118 and/or a braking module 212 may determine, based on this location, heading and speed information, whether braking is warranted. If yes, brakes may be applied and/or an alert message may be sent to the infotainment module 111 to indicate to the driver to apply the brakes. The alert message may be sent from any of the modules 104, 118, 200, 212 to the infotainment module 311.

The vehicle control module 104 may further determine the yaw rate of the vehicle 100 based on an output from a yaw rate sensor 208 (e.g., an accelerometer). Load on axles of the vehicle 100 may be determined based on outputs of load sensors 210.

The braking module 212 of the vehicle control module 104 may i) select a brake pressure or force versus brake actuator distance profile (hereinafter referred to as the "selected profile") and send the selected profile to the electronic control module 202 along with a current detected brake actuator displacement value, and/or ii) signal the electronic control module 202 a current detected brake actuator displacement value and object related information.

The current detected brake actuator displacement value indicates a current position of the brake actuator 170. The electronic control module 202 may adjust brake pressure or force based on the selected profile and the current detected brake actuator displacement value. The brake pressure and force are directly related. In another embodiment, the electronic control module 202 selects the profile, based on information provided to the electronic control module 202, such as locations, headings, speeds, and/or accelerations/decelerations of the host vehicle and a detected object of concern. The profile may also be selected based on the axle loading.

The braking stability module 103 and the electronic control module 202 may perform operations as further described below with respect to FIGS. 3-6 to stabilize braking of the vehicle.

The brake actuator system 158, as stated above, may be implemented as a brake-by-wire system, such as an electro-mechanical braking system or an electro-hydraulic braking system The brake actuator system 158 may include the EBCM 105, the brake actuator 170, the brake actuator sensor 172, and brake controllers and/or assemblies 220. The brake actuator system 158 is provided as an example and may be configured differently than shown in FIG. 2. As an example, the brake controllers and/or assemblies 220 may each be referred to as a brake circuit and include a EMB caliper including an electronic controller, an electric motor (or pump), and wiring connections (electromechanical braking system configuration). One or more EBCMs may be included. As an example, an EBCM may be included for the front wheels of the vehicle 100 and another EBCM may be included for the rear wheels of the vehicle.

The EBCM 105 may include the electronic control module 202 and a motor (or pump) 222. The motor 222 may be included for an electrohydraulic braking system configuration. A valve assembly 224 may be included as part of the EBCM 105, as shown or may be separate from the EBCM 105. The valve assembly 224 include valves 226 that may be connected to the motor 222 and control fluid connection between the motor 222 and the brake controllers and/or assemblies 220. Fluid lines 228 may be connected between the valve assembly 224 and the brake controllers and/or assemblies 220. When implemented as an electromechanical braking system, the motor 222, the valve assembly 224 and the fluid lines 228 are not included.

The electronic control module 202 and/or braking stability module 103 controls the motor 222 and the states of the valves 226 to adjust brake pressure. This may be based on a selected one of the brake pressure or force versus brake actuator distance profiles 230 stored in the memory 106 and/or pressures indicated by the braking stability module 103. This may additionally or alternatively be based on a selected one of brake force versus brake actuator distance profiles 231 stored in the memory 106 and/or forces indicated by the braking stability module 103. One of the brake pressure or force versus brake actuator distance profiles 230 may be selected by, for example, the braking stability module 103 and/or the electronic control module 202. The stated control may also be based on yaw rate, axle loads, vehicle speed, steering angle, scrub radius, and/or other permanent vehicle handling characteristics, and dynamic vehicle state parameters as further described below. The permanent vehicle handling characteristics and the dynamic vehicle state parameters may be stored in the memory 106

Scrub radius is defined by a point in space where an imaginary line traced down through the center of the suspension system column of a tire (on a wheel) crosses a line drawn vertically down through a center of a tire relative to an outer surface of the tire. The suspension system may be angled, where the wheel may not be angled (or perpendicular to a road surface). The scrub radius may be positive, zero or negative.

The brake actuator system 158 and/or the brake controllers and/or assemblies 220 may include brake sensors 230. The brake sensors may include pressure sensors, position sensors, temperature sensors, fluid detection sensors, etc. for detecting states of brake circuits, where each brake circuit includes one of the brake controllers and/or assemblies. The states of the brake circuits may include pressures, temperatures and/or presence of hydraulic fluid in each of the brake circuits. Each of the brake circuits includes a respect brake caliper. The sensors are monitored to detect when an issue and/or a failure exists in one or more of the brake circuits. These parameters are additional examples of the dynamic vehicle state parameters.

Figure 3:
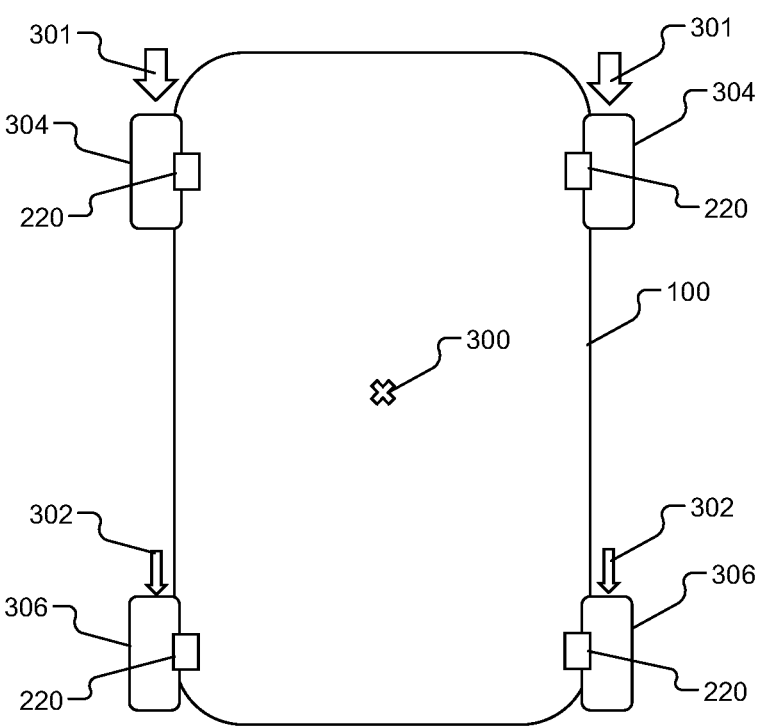
FIG. 3 is a top view of the vehicle of FIG. 1 illustrating relative and balanced application of brake torque via four active brake controllers while operating in a normal braking mode.

FIG. 3 shows the vehicle 100 illustrating relative and balanced application of brake torque via four active brake controllers while operating in a normal braking mode (i.e., fully active mode). The vehicle 100 includes a center of gravity, designated by 'X' 300 and four brake controllers and/or assemblies 220. Each of the brake controllers and/or assemblies 220 may include a brake controller, a motor (or pump) a brake caliper, brake pads, etc. The brake calipers are designated 221 in FIG. 2. As shown by large arrows 301 and small arrow 302, a larger amount of brake pressure may be applied to the two front wheels 304 than the two rear wheels 306. Brake tractive force (or simply braking force) is balanced side-to-side because a same total amount of brake tractive force is applied to the left (or driver) side wheels as is applied to the right (or passenger) side wheels. A same amount of brake tractive force is exerted on the left front wheel as the right front wheel. A same amount of brake tractive force is exerted on the left rear wheel as the right rear wheel.

Figure 4:
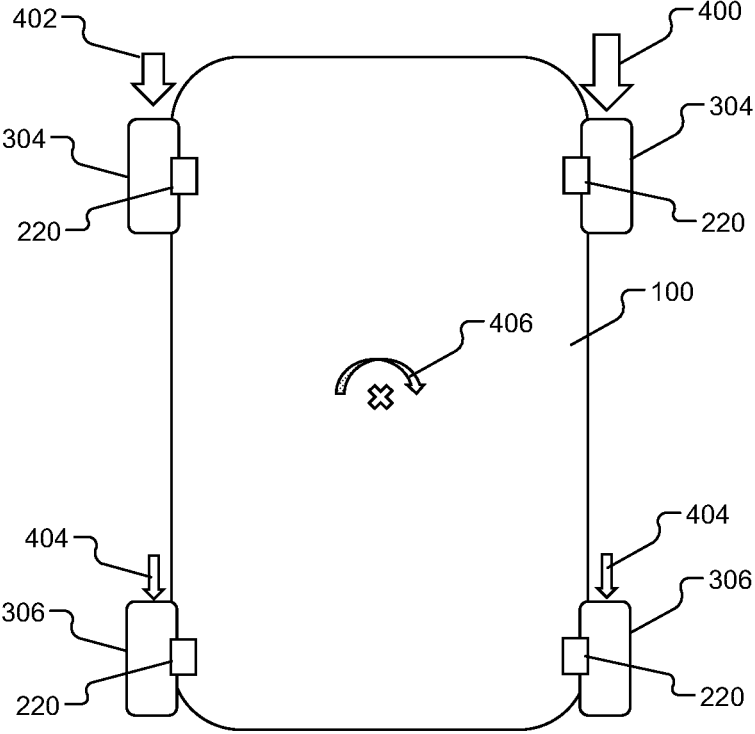
FIG. 4 is a top view of the vehicle of FIG. 1 illustrating relative and unbalanced application of brake torque via four active brake controllers while operating in a normal braking mode.

FIG. 4 shows the vehicle 100 illustrating relative and unbalanced application of brake torque via four active brake controllers while operating in a normal braking mode. In this example, all four brake controllers and/or assemblies 220 are active and applying brake pressure to each of the four wheels 304, 306 of the vehicle 100. In this example, the right front brake controller and/or assembly 220 provides greater brake traction force (or brake torque) than the left front brake, as represented by arrow 400 that is larger than the arrow 402. In this example, the left rear brake controller and/or assembly is providing a same amount of brake traction force as the right rear brake controller and/or assembly, which is represented by arrows 404. As a result, the vehicle 100 experiences an increased amount of yaw rate such that the vehicle pulls to the right, as shown by arrow 406.

The greater brake traction force on the right front wheel may be due to manufacturing differences in the brake calipers of the front wheels, small sizes differences in brake pads between the front calipers, a brake pad of the right front wheel hanging up, etc. The greater brake traction force may be due to an issue with the right front brake caliper and/or the right front brake controller and/or assembly. Clamp force and/or brake traction force may be adjusted at wheels other than where the greater amount of brake traction force exists. In one embodiment, adjustment in brake traction force at any of the brake controllers and/or assemblies is based on the reason for the imbalance and yaw rate and may be implemented to balance the right and left braking forces.

With intervention as disclosed herein, clamp force of one or more of the brake calipers 221 (shown in FIG. 2) of one or more of the brake controller and/or assemblies 220 is adjusted to compensate for the increase in yaw rate and to mitigate the yaw rate and the amount of vehicle pull. As an example, the brake controller and/or assembly of the right front wheel may reduce the amount of clamp force applied by the brake caliper of the right front wheel experiencing the increased brake traction force. This control is implemented by the braking stability module 204.

Figure 5:
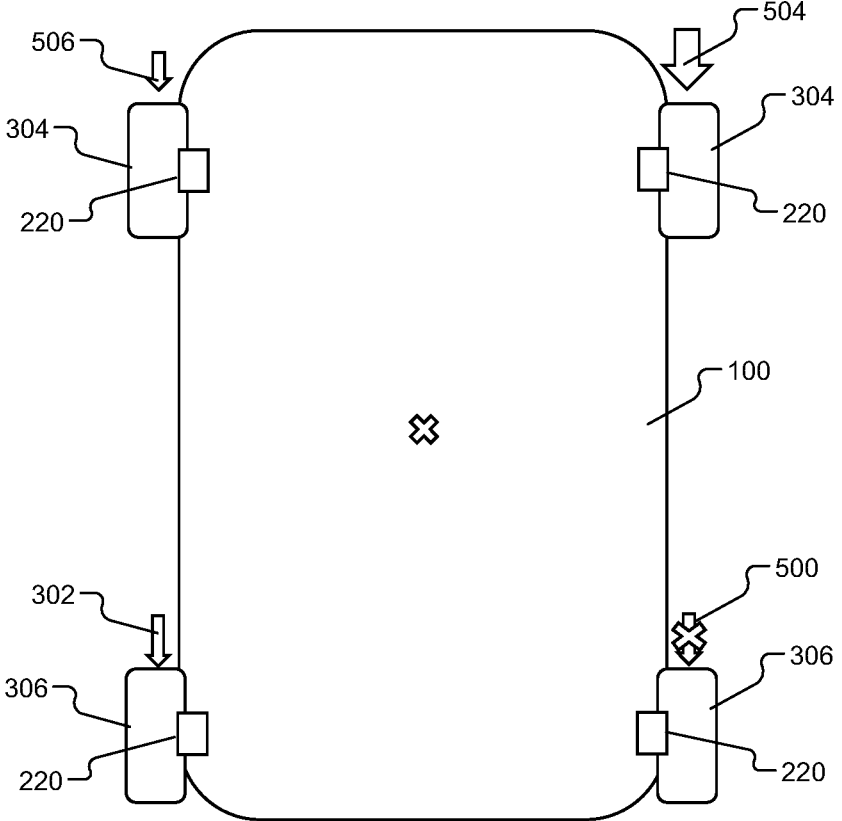
FIG. 5 is a top view of the vehicle of FIG. 1 illustrating yaw rate mitigated braking using three active brake controllers due to a braking system failure associated with a fourth brake controller and/or assembly.

FIG. 5 shows the vehicle 100 illustrating yaw rate mitigated braking using three active brake controllers due to a braking system failure associated with a fourth inactive brake controller and/or assembly. As an example, the failure may be with a brake controller and/or a brake caliper. In the example shown, the right rear brake controller and/or assembly is inactive due to an associated failure. This is represented by the cross-out arrow 500.

In a legacy system, where for example two brake calipers are part of a same hydraulic circuit, failure at one of the brake calipers would result in both brake calipers not being used for braking. This would leave use of only the other two brake calipers for braking.

The examples disclosed herein include independent control of each brake controller and/or assembly including independent control of each brake caliper. This includes being able to deactivate any one or more brake calipers at any time. The independent control is based on the brake system issue, failure within the brake system, permanent vehicle handling characteristics and dynamic vehicle state parameters. When as shown, one of the brake controllers and/or assemblies experiences a failure (e.g., failed brake caliper and/or improperly operating brake controller), that brake controller and/or assembly may be deactivated (e.g., hydraulic pressure to the brake caliper of that brake controller and/or assembly is reduced minimized and/or reduced to zero). Brake traction force of one or more brake calipers of one or more other brake controllers may be adjusted to balance brake force on each side of the vehicle, reduce yaw rate of the vehicle, and/or prevent yaw rate of the vehicle from increasing.

As the example shown, the right rear brake caliper is deactivated and the brake traction force (or clamping force) of the right front caliper is increased, as represented by large arrow 504. The brake traction force (or clamping force) of one or more of the left side calipers may be reduced, as represented by small arow 506. In the example shown, the brake traction force of the left front caliper is reduced and/or modulated (i.e., adjusted), as shown. This may be done to prevent the yaw rate of the vehicle from exceeding a predetermined threshold.

Figure 6:
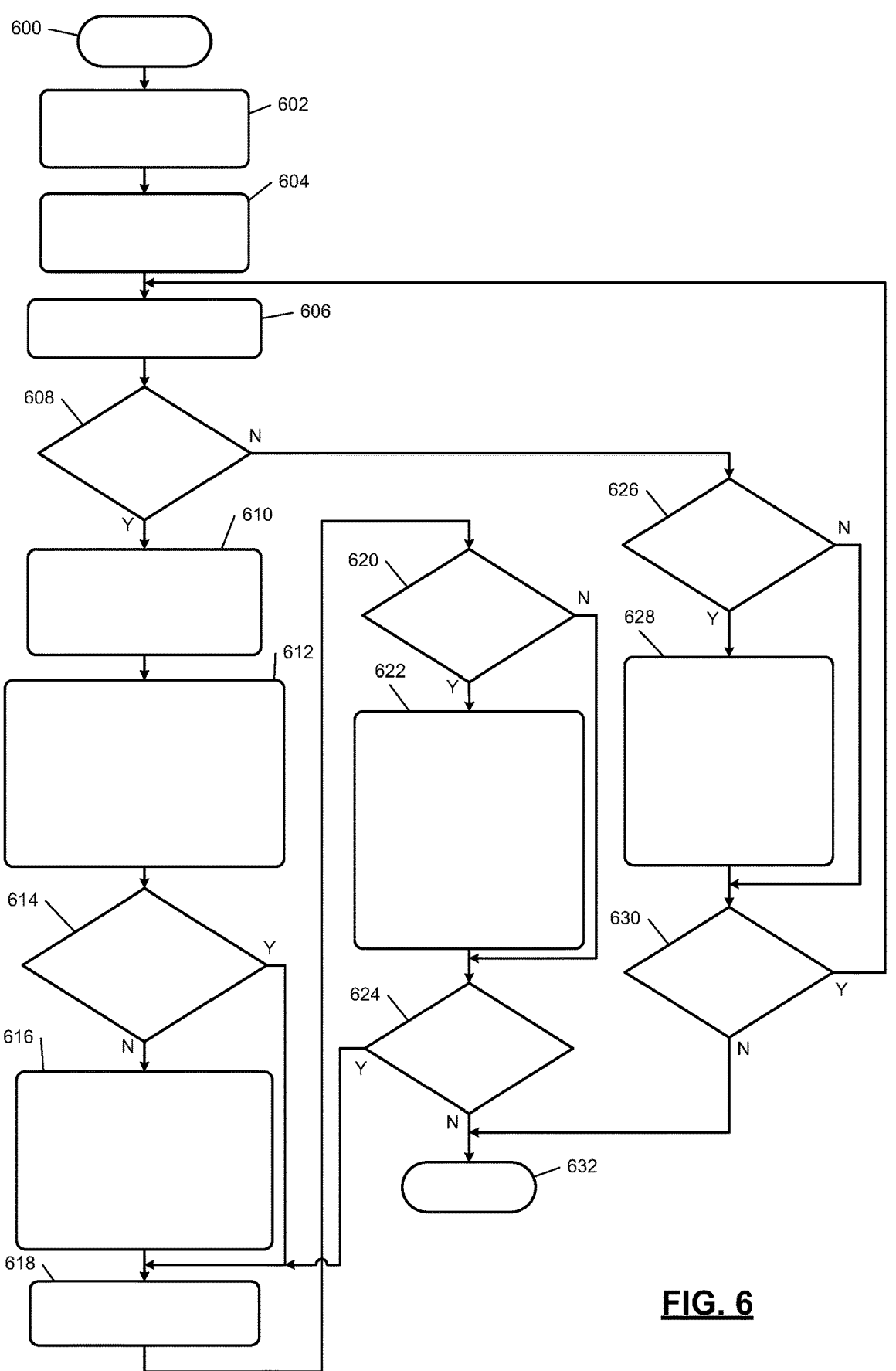
FIG. 6 illustrates a braking stability method in accordance with the present disclosure.

FIG. 6 shows a braking stability method. The following operations may be performed by, for example, one of the braking stability modules and/or corresponding control modules disclosed herein. Although the following method is described with respect to a vehicle having four brake circuits, the vehicle may have more than four brake circuits respectively for more than four wheels and similar operations may be performed.

The method may begin at 600. At 602, the braking stability module may receive a brake torque request signal from the brake actuator 170 and/or from, for example, the vehicle control module 104 or the braking module 212.

At 604, the braking stability module determines permanent vehicle handling characteristics such as the characteristics referred to herein. These characteristics may be stored in the memory 106 and accessed by the braking stability module.

At 606, the braking stability module determines dynamic vehicle state parameters such as the dynamic vehicle state parameters referred to herein. The parameters may be received from sensors and/or other devices referred to herein and/or may be determined based on the outputs of the sensors and/or other devices. The dynamic vehicle state parameters may be stored in the memory 106.

At 608, the braking stability module may determine if there has been a braking system failure. This may occur, for example, when a brake controller, a brake caliper, and/or other component of a brake controller and/or assembly is not operating appropriately. As an example, a brake caliper may be "frozen" and/or inoperable. As another example, a hydraulic fluid line supplying hydraulic fluid to a brake caliper and/or the brake caliper may have a hydraulic fluid leak. If a failure exists, operation 610 is performed, otherwise operation 626 may be performed.

At 610, the braking stability module may deactivate one or more faulty brake circuits and corresponding one or more brake controllers. This may include, for example, i) via the valve assembly 224 closing and/or changing state of one or more valves 226 to isolate the faulty one or more brake circuits, ii) deactivating one or more EMB calipers, and/or iii) shutting off one or more faulty brake controllers. Each of the brake circuits is able to be independently isolated.

At 612, the braking stability module determines locations of the one or more failures in the brake system. This includes determining the number of brake controllers and/or assemblies 220 (or brake circuits) involved and which ones of the brake controllers and/or assemblies 220 (or brake circuits) are involved.

At 614, the braking stability module may determine if more than one brake circuit is experiencing a failure. If no, operation 616 may be performed, otherwise operation 618 may be performed.

At 616, the braking stability module controls application of the three remaining brake circuits, which may remain in an active state. This may include controlling application of one or both active brake controllers on a same side of the vehicle according to one or more reduced braking profiles. The reduced braking profiles may be selected based on one or more of the dynamic vehicle state parameters referred to herein. This may include braking at a slower rate, then if all four brake circuits were active.

As an example and referring also to FIG. 5, the front and rear left side brake controllers and/or assemblies of the vehicle 100 may be operated according to reduced braking profiles to provide a reduced amount of brake traction force to balance the amount of brake traction force provided by the right front brake controller and/or assembly. In one embodiment, only one of the left side brake controllers and/or assemblies (e.g., the left front brake controller and/or assembly) is operated according to a reduced braking profile (having reduced amplitudes) and the other two brake controllers and/or assemblies are operated according to a normal (or full) braking profile (having non-reduced amplitudes). In an embodiment, the three remaining brake controllers and/or assemblies are modulated (i.e., adjusted up and down) to minimize yaw rate of the vehicle. The use of the third brake controller and/or assembly can increase the amount of braking without increase driver effort as compared to only using two of the brake controllers and/or assemblies. In one embodiment, the active brake controllers and/or assemblies are controlled to apply brake torque to maximize deceleration of the vehicle while minimizing the yaw rate of the vehicle.

At 618, the braking stability module may determine the dynamic vehicle state parameters. At 620, the braking stability module may determine whether the yaw rate is outside of a first set predetermined range (e.g., −1.0 degree per second (deg/s) to 1.0 deg/s). This is another example indication of a brake system issue and/or failure, which can cause an unexpected amount of brake torque being applied at the one or more brake controllers and/or assemblies experiencing an issue and/or failure. The unexpected amount of brake torque may refer to when, for example, one brake controller and/or assemblies on a first or driver side of the vehicle is providing an amount of brake torque that is outside of a second set predetermined range from an amount of brake torque applied at another brake controller and/or assembly on a a second or passenger side of the vehicle. The set predetermined range may be, for example, ±1-5% of the amount of brake torque applied at the driver side brake controller and/or assembly. As another example, the unexpected amount may be a ±1-5% difference from a target amount of brake torque. The target amount for a brake controller and/or assembly on a first side (driver or passenger side) of the vehicle, depending on the situation, may be i) within ±1-5% of a target amount for another brake controller and/or assembly on a second side (the other one of the driver or passenger side) of the vehicle, or ii) more or less than ±1-5% different than a target amount for another brake controller and/or assembly on a second side (the other one of the driver or passenger side) of the vehicle. The situations may refer to, for example, whether the vehicle is heading along a linear path, is merging, is experiencing loss in traction at one or more wheels, and/or is turning, which may include applying the same or different amounts of brake torque on different sides of the vehicle and/or at different wheels on a same side of the vehicle. If outside the first set predetermined range and/or second set predetermined range, operation 622 may be performed otherwise, operation 624 may be performed.

At 622, the braking stability module adjusts modulation of one or more of the brake controllers and/or assemblies in use to reduce yaw rate, mitigate increase in yaw rate due to the one or more brake failures, and/or reduce side-to-side brake torque differential of the vehicle 100. The side-to-side brake torque differential being a difference between a total amount of brake torque applied on a left side of the vehicle and a total amount of brake torque applied on a right side of the vehicle. Note that minimizing yaw rate may not minimize the side-to-side brake torque differential. The front brake calipers of a vehicle affect yaw rate more than the rear calipers of a vehicle for the same amount of brake torque applied. Thus, as an example, more brake torque may be applied on a first side of a vehicle than a second side of a vehicle if a higher percentage of the brake torque applied on the first side of the vehicle is applied at a rear caliper.

At 624, the braking stability module may determine whether the application of brake torque is still being requested. If yes, operation 618 may be performed, otherwise the method may end at 632.

At 626, the braking stability module may determine whether the yaw rate is outside of the first set predetermined range (e.g., −1.0 degree per second (deg/s) to 1.0 deg/s) and/or the amount of brake torque of one or more brake controllers and/or assemblies is outside a second set predetermined range, as similarly described above for operation 620. If outside the first set predetermined range and/or the second set predetermined range, operation 628 may be performed otherwise, operation 624 may be performed.

At 628, the braking stability module adjusts modulation of one or more of the active brake controllers and/or assemblies to reduce yaw rate of the vehicle and/or reduce side-to-side brake torque differential. This may include, for example, decreasing the amount of brake torque being applied at the brake controller and/or assembly experiencing an issue, which is causing more braking torque than expected. The issue may be due to a permanent vehicle handling characteristic. Braking torque of one or more other brake controllers and/or assemblies may also or alternatively be adjusted to compensate for the unexpected amount of brake torque at the brake controller and/or assembly experiencing the issue.

Operations 622 and 628 are implemented to prevent vehicle pulling. If non-symmetrical brake torque is applied to brakes of the vehicle 100, the vehicle 100 pulls to one side. Operations 622 and 628 are performed based on the permanent vehicle handling characteristics, the dynamic vehicle state parameters, and locations of the active brake circuits to maintain vehicle stability. This includes modulating the braking force at the active brake controllers and/or assemblies to maintain the yaw rate of the vehicle within the predetermined range and the appropriate amount of vehicle deceleration. Less force may be provided to a front brake caliper than a rear brake caliper, when a lower amount of yaw correction is being provided, because the front brake caliper provides more yaw correction.

During operations 622 and 628 when the side-to-side brake torque differential exceeds a predetermined threshold, one or more gain scaling factors may be applied respectively to the clamping forces applied at one or more of the brake controllers and/or assemblies to change the amount of clamping force applied and reduce the side-to-side brake torque differential. For example, when the amount of brake torque applied on a first side of the vehicle 100 is more than 1-5% higher than the amount of brake torque applied on a second side of the vehicle 100, than one or more gain scaling factors may be applied to reduce the amount of clamping force on the first side of the vehicle 100 or to increase the amount of clamping force on the second side of the vehicle 100. The brake torque applied on each side of the vehicle is able to be adjusted in real time (e.g., within milliseconds when dynamic vehicle state parameters are detected) and/or instantaneously to i) equalize side-to-side the amounts of brake torque applied, ii) reduce and/or minimize yaw rate of the vehicle 100, and/or iii) prevent the yaw rate of the vehicle 100 from increasing.

At 630, the braking stability module may determine whether brake torque is still being requested. If yes, operation 606 may be performed, otherwise the method may end at 632.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The examples set forth herein allow three brake circuits to be used to decelerate a vehicle in the event that a failure exists in a fourth brake circuit. The fourth brake circuit is able to be isolated and/or deactivated while allowing use of the other three brake circuits. This provides an increased amount of deceleration as compared to when two brake circuits are deactivated. The examples also allow for yaw rate to be minimized during non-failed states of operation when, for example, certain factors induce side-to-side differences in braking forces causing increased vehicle yaw rates. Side-to-side braking forces are dynamically adjusted to prevent increases in yaw rate and/or to reduce and/or minimize yaw rate of the vehicle. The certain factors can include part-to-part variation due to manufacturing and/or other factors that cause different levels of braking torque. Additional deceleration using a third active brake controller and/or assembly, as opposed to using only two brake controllers and/or actuators, is provided without negatively affecting vehicle handling and/or stability.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A braking system comprising:
a plurality of brake circuits configured to be independently activated and deactivated and when activated apply braking force at respective wheels of a vehicle; and
a braking stability module configured to detect an issue or a failure with a first one of the plurality of brake circuits where an unexpected amount of braking torque is being applied as compared to an amount of braking torque applied at a second one of the plurality of brake circuits, and mitigate effect of the unexpected amount of braking torque on a yaw rate of the vehicle by at least one of i) adjusting the braking torque of the first one of the plurality of brake circuits to compensate for the unexpected amount of braking torque, ii) adjusting braking torque of the second one of the plurality of brake circuits to compensate for the unexpected amount of braking torque, and iii) deactivating the first one of the plurality of brake circuits and modulating braking torque of the second one of the plurality of brake circuits to compensate for the unexpected amount of braking torque, the first one of the plurality of brake circuits being on a different side of the vehicle than the second one of the plurality of brake circuits.

2. The braking system of claim 1, wherein the braking stability module is configured to mitigate the effect of the unexpected amount of braking torque on the yaw rate of the vehicle by adjusting the braking torque of the first one of the plurality of brake circuits to compensate for the unexpected amount of braking torque.

3. The braking system of claim 1, wherein the braking stability module is configured to mitigate the effect of the unexpected amount of braking torque on the yaw rate of the vehicle by adjusting braking torque of a second one of the plurality of brake circuits to compensate for the unexpected amount of braking torque.

4. The braking system of claim 1, wherein the braking stability module is configured to mitigate the effect of the unexpected amount of braking torque on the yaw rate of the vehicle by deactivating the first one of the plurality of brake circuits and modulate braking torque of the second one of the plurality of brake circuits.

5. The braking system of claim 1, wherein the braking stability module is configured to mitigate the effect of the unexpected amount of braking torque on the yaw rate of the vehicle by modulating braking force of at least one of the first one of the plurality of brake circuits and the second one of the plurality of brake circuits based on permanent vehicle handling characteristics.

6. The braking system of claim 1, wherein the braking stability module is configured to mitigate the effect of the unexpected amount of braking torque on the yaw rate of the vehicle by modulating braking force of at least one of the first one of the plurality of brake circuits and the second one of the plurality of brake circuits based on dynamic vehicle state parameters.

7. The braking system of claim 1, wherein the braking stability module is configured to mitigate the effect of the unexpected amount of braking torque on the yaw rate of the vehicle by modulating braking force of at least one of the first one of the plurality of brake circuits and the second one of the plurality of brake circuits based on a location of the first one of the plurality of brake circuits.

8. The braking system of claim 1, wherein the braking stability module is configured to detect a failure with the first one of the plurality of brake circuits, and in response to detecting the failure, deactivating the first one of the plurality of brake circuits and modulating braking torque of the second one of the plurality of brake circuits.

9. The braking system of claim 1, wherein the braking stability module is configured to determine a side-to-side brake torque differential of the vehicle and reduce the side-to-side brake torque differential by at least one of i) increasing the braking torque of the first one of the plurality of brake circuits, ii) adjusting braking torque of the second one of the plurality of brake circuits, and iii) deactivating the first one of the plurality of brake circuits and modulating braking torque of the second one of the plurality of brake circuits.

10. The braking system of claim 1, wherein the braking stability module is configured to detect a failure of the first one of the plurality of brake circuits and maintain active operation of all of the other ones of the plurality of brake circuits to maximize deceleration of the vehicle while minimizing the yaw rate of the vehicle.

11. The braking system of claim 1, wherein the braking stability module is configured, in response to the unexpected amount of braking torque being more than expected, to compensate for the unexpected amount of braking torque by adjusting at least one of i) the braking torque of the first one of the plurality of brake circuits, and ii) the braking torque of the second one of the plurality of brake circuits.

12. The braking system of claim 1, wherein:

the braking stability module is configured to increase an amount of brake torque of the second one of the plurality of braking circuits when the unexpected amount of braking torque is more than expected; and the second one of the plurality of braking circuits is on a same side of the vehicle as the first one of the plurality of braking circuits.

13. The braking system of claim 1, wherein:

the braking stability module is configured to decrease an amount of brake torque of the second one of the plurality of braking circuits when the unexpected amount of braking torque is more than expected; and the second one of the plurality of braking circuits is on an opposite side of the vehicle as the first one of the plurality of braking circuits.

14. The braking system of claim 1, wherein the braking stability module is configured to decrease an amount of brake torque of the first one of the plurality of braking circuits, which is at a wheel associated with the failure when the unexpected amount of braking torque is more than expected.

15. The braking system of claim 1, wherein at least a portion of each of the plurality of braking circuits is located at a respective wheel of the vehicle.

16. The braking system of claim 1, wherein each of the plurality of braking circuits comprises a respective caliper and brake pads.

17. A braking stability method comprising:

detecting an issue or a failure with a first one of a plurality of brake circuits where an unexpected amount of braking torque is being applied as compared to an amount of braking torque applied at a second one of the plurality of brake circuits, the plurality of brake circuits being configured to be independently activated and deactivated and when activated apply braking force at respective wheels of a vehicle; and mitigating effect of the unexpected amount of braking torque on a yaw rate of the vehicle by at least one of i) adjusting the braking torque of the first one of the plurality of brake circuits to compensate for the unexpected amount of braking torque, ii) adjusting braking torque of the second one of the plurality of brake circuits to compensate for the unexpected amount of braking torque, and iii) deactivating the first one of the plurality of brake circuits and modulating braking torque of the second one of the plurality of brake circuits, the first one of the plurality of brake circuits being on a different side of the vehicle than the second one of the plurality of brake circuits.

18. The braking stability method of claim 17, further comprising detecting a failure with the first one of the plurality of brake circuits, and in response to detecting the failure, deactivating the first one of the plurality of brake circuits and modulating braking torque of the second one of the plurality of brake circuits.

19. The braking stability method of claim 17, further comprising determining a side-to-side brake torque differential of the vehicle and reduce the side-to-side brake torque differential by at least one of i) increasing the braking torque of the first one of the plurality of brake circuits, ii) adjusting braking torque of the second one of the plurality of brake circuits, and iii) deactivating the first one of the plurality of brake circuits and modulating braking torque of the second one of the plurality of brake circuits.

20. The braking stability method of claim 17, further comprising detecting a failure of the first one of the plurality of brake circuits and maintain active operation of all of the other ones of the plurality of brake circuits to maximize deceleration of the vehicle while minimizing the yaw rate of the vehicle.

* * * * *